United States Patent
Kormos et al.

(10) Patent No.: US 12,269,375 B2
(45) Date of Patent: Apr. 8, 2025

(54) VEHICLE SEAT ASSEMBLY HAVING A PIVOT PITCH

(71) Applicant: Ford Global Technologies, LLC, Dearborn, MI (US)

(72) Inventors: Kurt Leon Kormos, Milford, MI (US); Rabindranath Persad, Ann Arbor, MI (US); Thomas J. Susko, Saint Clair Shores, MI (US); Frank Glenn Walega, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 17/881,886

(22) Filed: Aug. 5, 2022

(65) Prior Publication Data

US 2024/0042904 A1    Feb. 8, 2024

(51) Int. Cl.
 *B60N 2/10* (2006.01)
 *B60N 2/12* (2006.01)
 *B60N 2/14* (2006.01)
 *B60N 2/30* (2006.01)

(52) U.S. Cl.
 CPC .............. *B60N 2/10* (2013.01); *B60N 2/12* (2013.01); *B60N 2/14* (2013.01); *B60N 2/3031* (2013.01)

(58) Field of Classification Search
 CPC ... B60N 2/10; B60N 2/14; B60N 2/12; B60N 2/3031
 See application file for complete search history.

(56) References Cited

U.S. PATENT DOCUMENTS

| | | | |
|---|---|---|---|
| 7,014,263 B2 | 3/2006 | Mukoujima et al. | |
| 7,300,107 B2 | 11/2007 | Kammerer | |
| 7,517,022 B2 | 4/2009 | Habedank et al. | |
| 7,758,123 B2 * | 7/2010 | Picker | B60N 2/3011 296/65.09 |
| 8,251,450 B2 | 8/2012 | Carroll et al. | |

(Continued)

FOREIGN PATENT DOCUMENTS

| | | | |
|---|---|---|---|
| DE | 102004039246 A1 * | 2/2006 | ........... B60N 2/3011 |
| DE | 102004039249 B4 | 8/2006 | |

(Continued)

OTHER PUBLICATIONS

2007 Chevrolet Equinox Owner Manual, 2007, cover page and pp. 14-18.

*Primary Examiner* — Timothy J Brindley
(74) *Attorney, Agent, or Firm* — Vichit Chea; Price Heneveld LLP

(57) ABSTRACT

A vehicle seat assembly convertible between a use position and a non-use position. The vehicle seat assembly includes a seat with a seat cushion support, a seatback, a base that connects to a vehicle, a front pivot linkage supported by the base by a first joint and pivotally connected to the seat cushion support by a second joint, and a rear foot pivotally supported by the base by a third joint. A pivoting movement of the rear foot about the third joint is lockable. The rear foot is connected to the seatback by a fourth joint. The vehicle seat also includes a fifth joint that connects the seatback to the seat cushion support, wherein the fourth joint is a latch and the fifth joint provides a free pivot, and wherein the fourth joint is latched when the seat moves from the use position to a boarding non-use position.

18 Claims, 4 Drawing Sheets

(56) References Cited

U.S. PATENT DOCUMENTS

| | | | |
|---|---|---|---|
| 8,313,144 B2 | 11/2012 | Holdampf | |
| 8,424,969 B2 | 4/2013 | Kammerer | |
| 10,829,014 B2 | 11/2020 | Sivaraj | |
| 10,899,250 B2 | 1/2021 | Aktas et al. | |
| 10,926,673 B2 | 2/2021 | Kaemmerer | |
| 2010/0295353 A1 | 11/2010 | Tame | |
| 2015/0375637 A1* | 12/2015 | Kikuchi | B60N 2/3011 297/316 |
| 2024/0042903 A1* | 2/2024 | Stapleton | B60N 2/3031 |

FOREIGN PATENT DOCUMENTS

| | | | | |
|---|---|---|---|---|
| DE | 202006004326 U1 | 8/2006 | | |
| DE | 102009007051 B3 * | 5/2010 | | B60N 2/10 |
| EP | 1882609 A1 | 1/2008 | | |
| FR | 2929179 A1 * | 10/2009 | | B60N 2/01533 |
| WO | 03045731 A1 | 6/2003 | | |
| WO | WO-2008107100 A1 * | 9/2008 | | B60N 2/206 |
| WO | WO-2010001052 A2 * | 1/2010 | | B60N 2/01533 |
| WO | 2018036538 A1 | 3/2018 | | |
| WO | WO-2021263103 A1 * | 12/2021 | | B60N 2/02246 |
| WO | WO-2023073299 A1 * | 5/2023 | | B60N 2/02246 |

\* cited by examiner

VEHICLE SEAT ASSEMBLY HAVING A PIVOT PITCH

FIELD OF THE DISCLOSURE

The present disclosure generally relates to a vehicle seating assembly, and more particularly relates to a vehicle seating assembly that may be arranged in use and non-use positions.

BACKGROUND OF THE DISCLOSURE

Seating assemblies are widely used in motor vehicles. Some vehicle seating assemblies are designed to allow the seat to be configured in various positions to accommodate vehicle seating and ingress and egress from the vehicle.

SUMMARY OF THE DISCLOSURE

According to a first aspect of the present disclosure, a vehicle seat assembly convertible between a use position and a non-use position is provided. The vehicle seat assembly includes a seat with a seat cushion support, a seatback, a base configured to connect to a vehicle, a front pivot linkage supported by the base by a first joint and pivotally connected to the seat cushion support of the seat by a second joint, and a rear foot pivotally supported on the base by a third joint, wherein a pivoting movement of the rear foot about the third joint is lockable, and wherein the rear foot is connected to the seatback by a fourth joint. The vehicle seat assembly also includes a fifth joint that connects the seatback to the seat cushion support, wherein the fourth joint is a latch and the fifth joint provides a free pivot, and wherein the fourth joint is latched when the seat moves from the use position to a boarding non-use position.

Embodiments of the first aspect of the present disclosure can include any one or a combination of the following features:
- the vehicle seat is further convertible to a folded non-use position by unlatching the latch at the fourth joint;
- the latch comprises a recliner mechanism;
- the latch comprises a recliner heart;
- a stop member supported on the base and located forward of the rear foot to contact the rear foot in the boarding non-use position;
- the stop member is connected to a mount supporting the first joint;
- a bias spring for biasing the rear foot to pivot forward towards the stop member;
- the seat cushion support comprises a rigid member; and
- a lock mechanism operatively coupling the rear foot to the base to lock the third joint.

According to a second aspect of the present disclosure, a vehicle seat assembly convertible between a use position and a non-use position. The vehicle seat assembly includes a seat with a seat cushion support, a seatback, a base configured to connect to a vehicle, a front pivot linkage supported by the base by a first joint and pivotally connected to the seat cushion support of the seat by a second joint, and a rear foot pivotally support by the base by a third joint, wherein a pivoting movement of the rear foot about the third joint is lockable by a lock mechanism, and wherein the rear foot is connected to the seatback by a fourth joint. The vehicle seat assembly also includes a fifth joint that connects the seatback to the seat cushion support, wherein the fourth joint is a latch and the fifth joint provides a free pivot, and wherein the fourth joint is latched when the seat moves from the use position to a boarding non-use position, a stop member located forward of the rear foot to contact the rear foot in the boarding non-use position, and a biasing spring for biasing the rear foot to pivot forward towards the stop member.

Embodiments of the second aspect of the present disclosure can include any one or a combination of the following features:
- the vehicle seat is further convertible to a folded non-use position by unlatching the latch at the fourth joint;
- the latch comprises a recliner mechanism;
- the latch comprises a recliner heart;
- the stop member is connected to a mount supporting the first joint;
- the seat cushion support comprises a rigid member; and
- the locking mechanism operatively couples the rear foot to the base to lock the third joint.

According to a third aspect of the present disclosure, a vehicle is provided and includes a cabin interior and a vehicle seat assembly convertible between a use position and a non-use position. The vehicle seat assembly also includes a seat with a seat cushion support, a seatback, a base connected to the vehicle in the cabin interior, and a front pivot linkage supported by the base by a first joint and pivotally connected to the seat cushion support of the seat by a second joint. The vehicle seat assembly further includes a rear foot pivotally supported on the base by a third joint, wherein a pivoting movement of the rear foot about the third joint is lockable, and wherein the rear foot is connected to the seatback by a fourth joint, and a fifth joint that connects the seatback to the seat cushion support, wherein the fourth joint is a latch and the fifth joint provides a free pivot, and wherein the fourth joint is latched when the seat moves from the use position to a boarding non-use position.

Embodiments of the third aspect of the present disclosure can include any one or a combination of the following features:
- the vehicle seat is further convertible to a folded non-use position by unlatching the latch at the fourth joint;
- a stop member supported on the base and located forward of the rear foot to contact the rear foot in the boarding non-use position; and
- a bias spring for biasing the rear foot to pivot forward towards the stop member.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
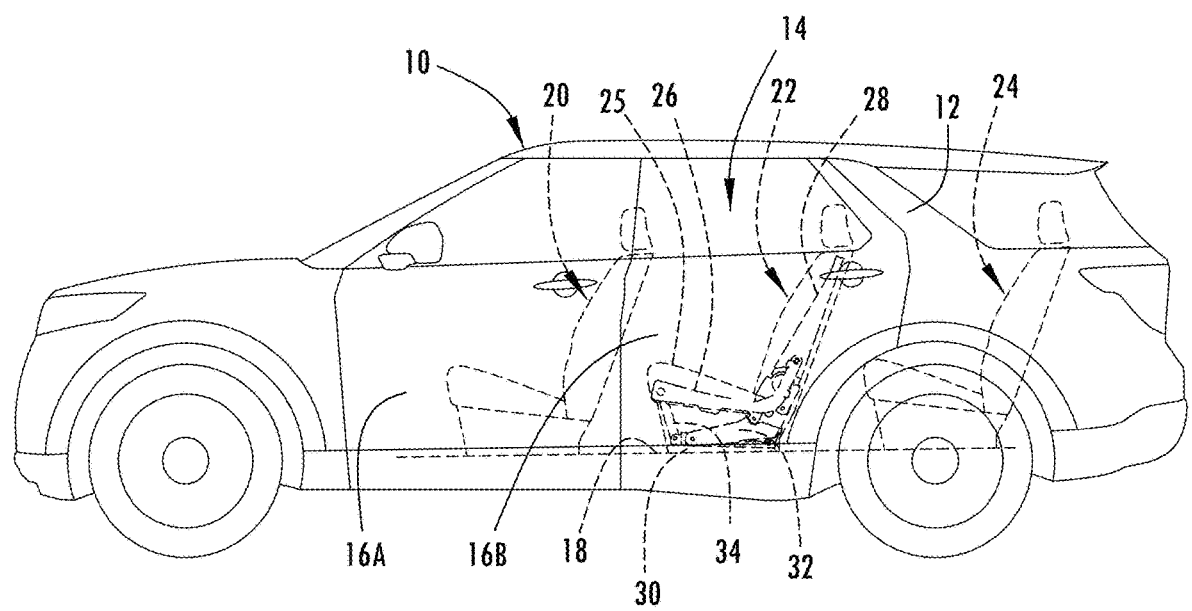
FIG. 1 is a side perspective view of a vehicle having vehicle seating including a middle row vehicle seat assembly configured to transition between use and non-use positions.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seat assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating and accommodations for transporting one or more passengers. The motor vehicle 10 has a vehicle body 12 that generally defines a cabin interior 14. The cabin interior 14 may contain various features and trim components within the vehicle body 12. The cabin interior 14 is shown having an arrangement of passenger seats including a front row of seating having front row seat assemblies 20 which may include a driver seat assembly and a passenger seat assembly, a second row of seating having second row seat assemblies 22 and a third row of seating having third row seat assemblies 24. The seating arrangement includes three rows of seating, according to this example. The vehicle 10 may have other numbers of rows of seating including one or two rows of seating or more than three rows of seating as may exist for large SUVs, vans and buses. It should be appreciated that the vehicle 10 may be a motor vehicle, such as a wheeled car, truck, SUV, van or bus, for example, or an airplane, train, boat or other vehicle capable of transporting one or more passengers.

The cabin interior 14 shown in FIG. 1 has the front row of seat assemblies 20, a second row of seat assemblies 22 and a third row of seat assemblies 24 supported on and connected to the vehicle floor 18. Each of the first, second and third rows of seating may include one, two or three seating assemblies, according to some examples. In addition, the first row of seat assemblies 20 are located proximate to a front side door 16A, and the second row of seat assemblies 22 are located proximate to a rear side door 16B. A driver or passenger may enter the front side door 16A to access the front row of seat assemblies 20 and may enter the rear side door 16B to access the second row of seat assemblies 22. In order to enter or exit the vehicle 10 to or from the third row of seat assemblies 24, a passenger seated or to be seated in a third row vehicle seat assembly 24 may exit and enter the vehicle 10 via the rear side door 16B. In order to enable access to the third row seat assemblies 24, one or more of the second row of seat assemblies 22 is configured to move in a pivot pitch motion between a use position configured to receive and hold a seated user, such as a passenger, and a first non-use position tilted or pitched forward to allow greater access for the passenger(s) entering or exiting the vehicle 10 from or to the third row of seat assemblies 24.

Figure 2:
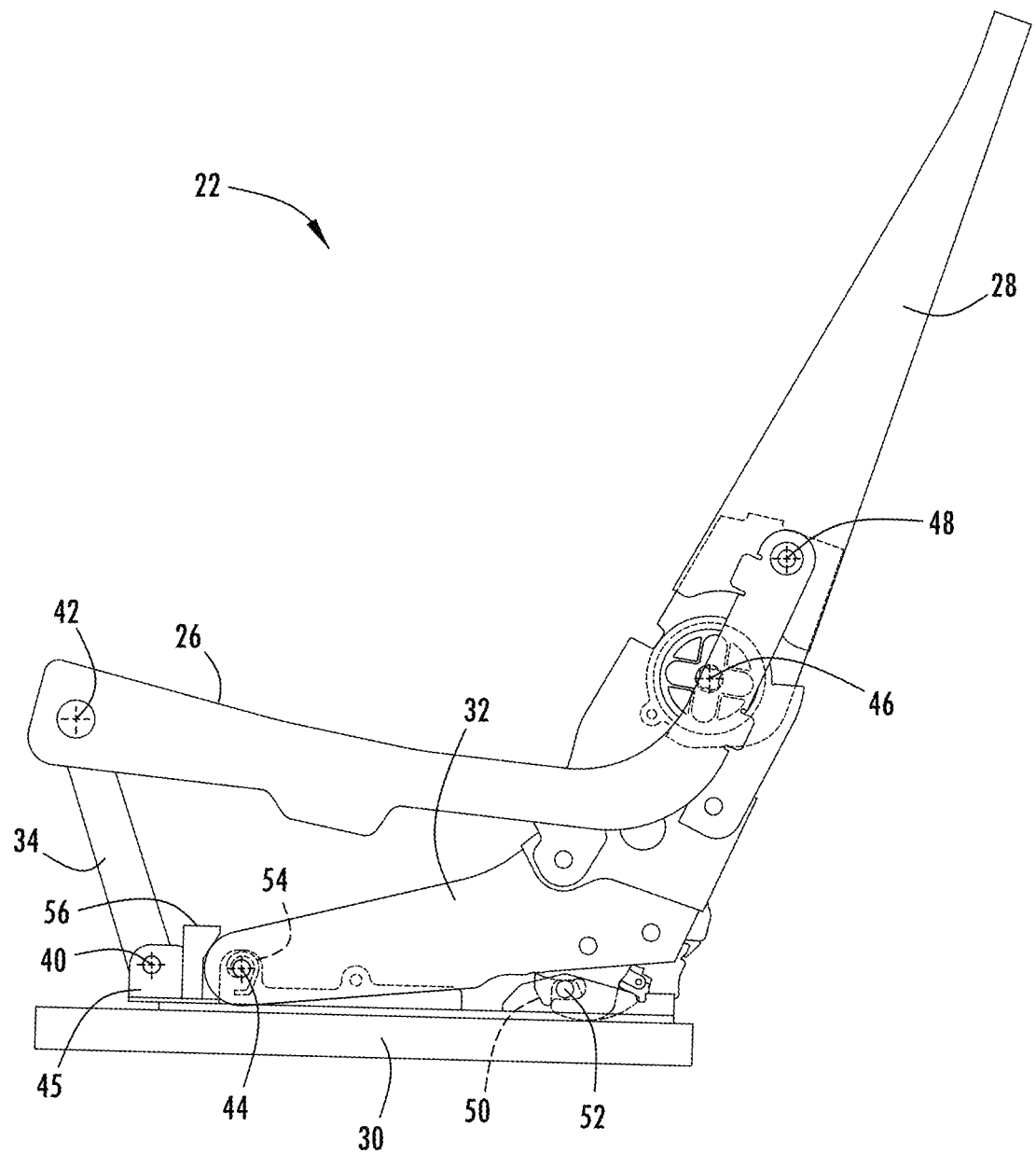
FIG. 2 is a schematic side view of the middle row vehicle seat assembly configured in a use position.
Figure 3:
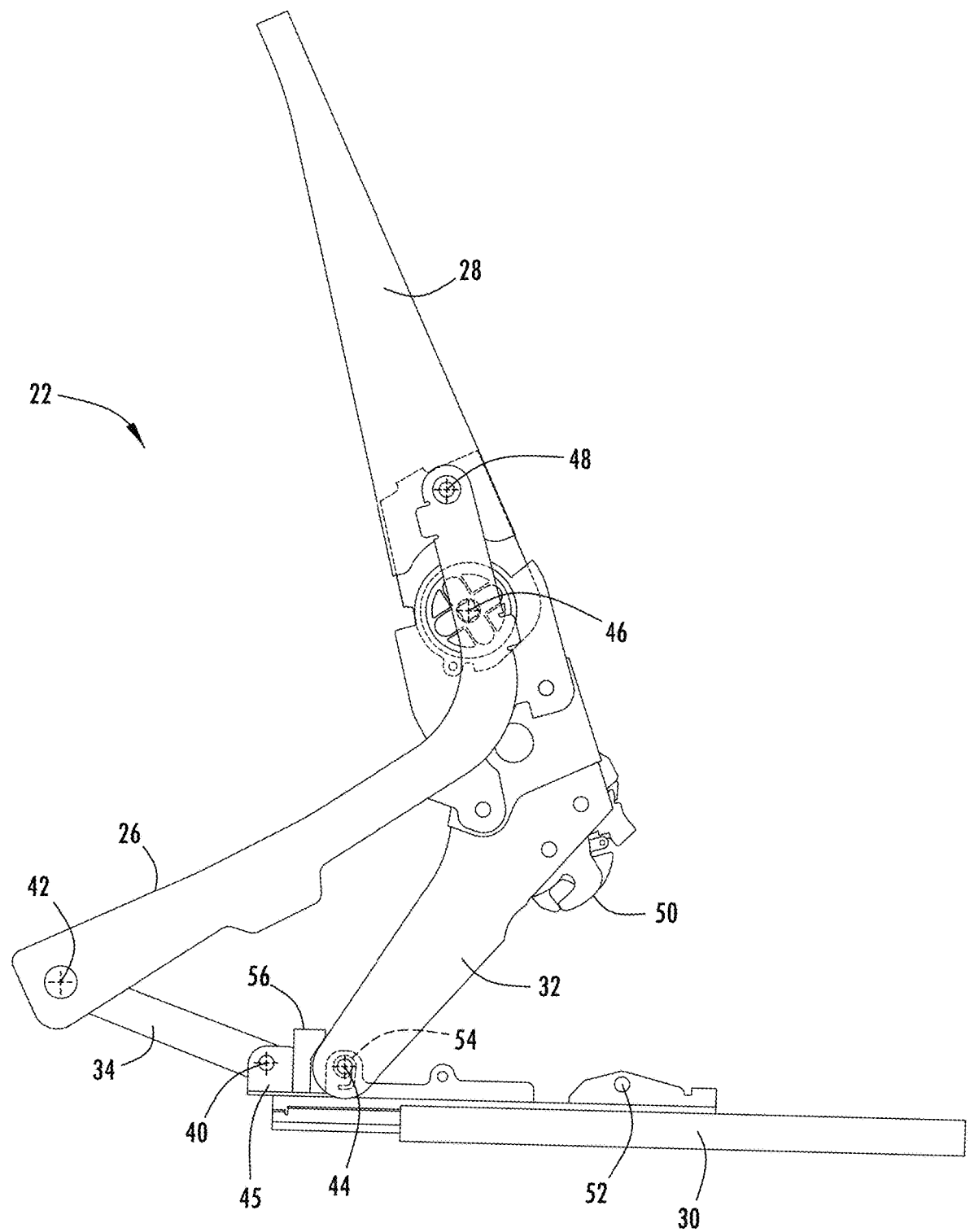
FIG. 3 is a schematic side view of the vehicle seat assembly of FIG. 2 shown in a first non-use position pitched forward.
Figure 4:
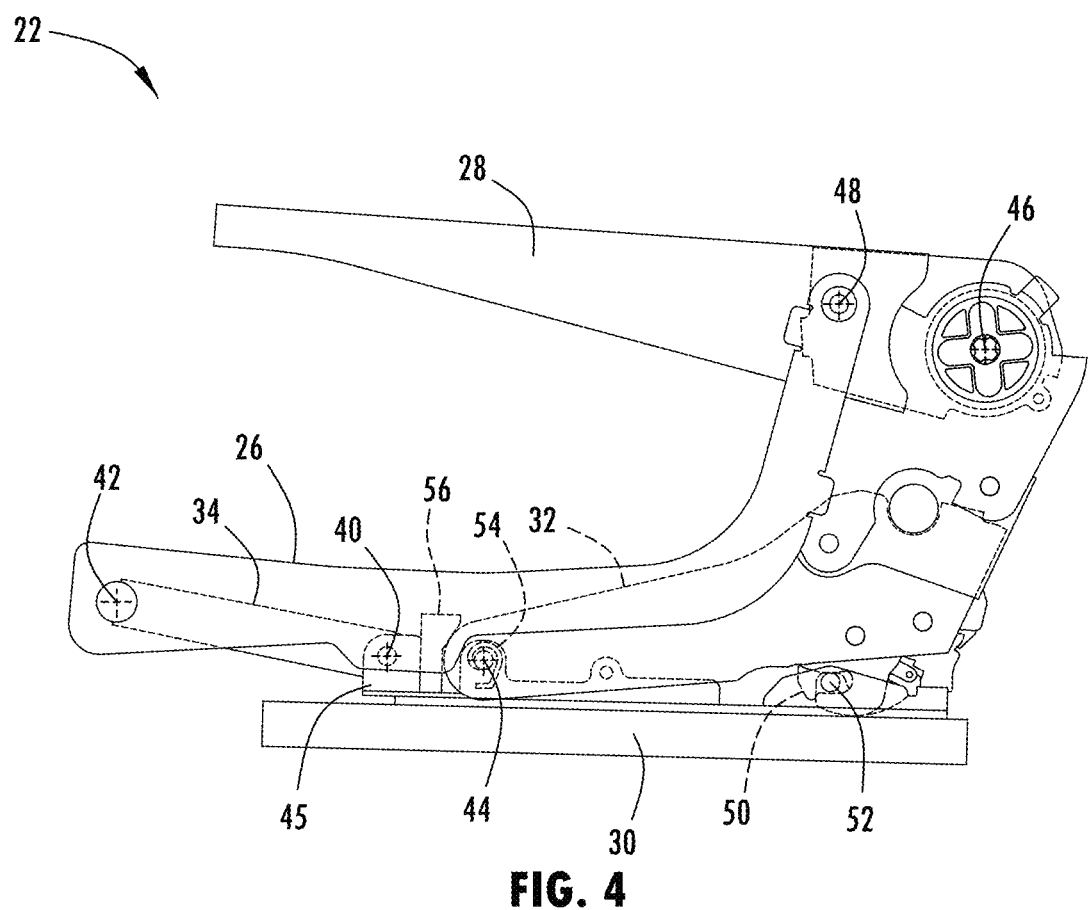
FIG. 4 is a schematic side view of the vehicle seat assembly shown in FIG. 2 illustrated in a second non-use position with the seatback folded.

The vehicle seat assembly 22 is illustrated in FIGS. 2-4, according to one embodiment. In this embodiment, the vehicle seating assembly 22 is a second or middle row seating assembly that pivots to pitch forward to a first non-use position to allow enhanced access to the third row of seating. Referring to FIG. 2, the vehicle seat assembly 22 shown in one example as the second row of seating is illustrated in a use position configured to hold a seated passenger in a vehicle forward facing direction. In FIG. 3, the vehicle seat assembly 22 is arranged in a first non-use boarding position tilted or pitched forward about the front bottom side to allow for enhanced space for a user to enter or board and exit the space behind the vehicle seat assembly 22, such as to enter or exit from or to the third row of seat assemblies 24 from the rear side door 16B. In FIG. 4, the vehicle seat assembly 22 is illustrated in a second non-use position with a seatback folded forward to a flat position to allow for enlarged space for storage in the vehicle 10 when the seat assembly 22 is not in use.

The vehicle seat assembly 22 has a seat 26 which provides a cushion carrier for holding a seat cushion 25 and a seatback 28. The vehicle seat assembly 22 is oriented vehicle forward such that the seat 26 generally extends horizontal and vehicle forward of the seatback 28 in the use position. The term seat should be understood to mean the entire subassembly made up of a structure having a seat cushion support and an upholstered cushion. The seatback 28 may likewise include a seatback structure and an upholstered cushion. The seatback 28 is operationally coupled to the seat 26 via one or more fittings.

The vehicle seat assembly 22 includes a rear foot 32 on opposite lateral sides and operationally coupled to the seatback 28. Each rear foot 32 has a pivot or articulation joint 44 at the front end thereof and a lock mechanism including a latch 50 that engages a latch bolt 52 on the base 30 at the rear end thereof in this example. The rear foot 32 may be a unitary metal structure that supports the seat 26 on the rear end and the seatback 28 on the bottom end. It should be appreciated that the rear foot 32 on each opposite lateral side may be connected together with one or more support members such as tubes or rods, for example. The lock mechanism may lock or latch the seat assembly 22 onto the base 30 in the use position and the second non-use position with the seatback 28 folded forward. The lock mechanism may be unlocked or unlatched to allow the rear foot 32 and the seat assembly 22 to pivot or pitch forward to the first non-use position.

The vehicle seat assembly 22 further includes a front pivot linkage 34 on each lateral side coupling the front of the seat 26 to a bracket on the base 30 via a pair of articulation joints. The front pivot linkage 34 is shown in the shape of an elongated member such as a bar or arm. Included is a first articulation joint 40 connecting the lower end of the front pivot linkage 34 to a mount in the form of a bracket 45 on the base 30 and a second articulation joint 42 connecting the upper end of the front pivot linkage 34 to a forward end of the seat 26. The first and second articulation joints 40 and 42 are free pivot joints that allow the front pivot linkage 34 to rotate counterclockwise to move forward and downward and clockwise to move rearward and upward. The vehicle seat assembly 22 includes a third joint 44 coupling the front portion of the rear foot 32 to the base 30. As such, the rear foot 32 may rotate about the third joint 44 when the lock mechanism is unlocked. This includes the rear foot 32 rotating about the front end so that the rear end pivots upward and forward.

The vehicle seat assembly 22 further includes a fourth joint 46 coupling the seatback 28 to the rear foot 32. The fourth joint 46 is a lockable joint that may include a latch that may be locked to fix the seatback 28 relative to the seat 26 and may further be unlocked to allow rotation of the seatback 28 relative to the rear foot 32. The fourth joint 46 may include a recliner mechanism such as a recliner heart that may include a housing member, a locking plate and a pawl, for example. In the unlocked position, the seatback 28 may pivot forward to a folded position in the second non-use storage position.

The vehicle seat assembly 22 further includes a fifth joint 48 coupling the seatback 28 to the seat 26. The fifth joint 48 is a freely moving articulation joint that allows free movement of the seatback 28 in response to movement of the seat 26 as the seat 26 rocks or pitches forward to the first non-use boarding position and returns to the use position. The seatback 28 pivots forward relative to the seat 26 as the seat 26 rocks forward.

The vehicle seat assembly 22 may be moved from the use position shown in FIG. 2 to one of the first and second non-use positions shown respectively in FIGS. 3 and 4. In order to move the vehicle seat assembly 22 from the use position to the first non-use boarding position, the latch lock 50 is disengaged from lock bolt 52 to release the heel of the rear foot 32. This may be achieved via a user manually operating a lever or with use of an actuator such as a motor. Upon unlocking the latch lock 50, the rear foot 32 and thus, the vehicle seat assembly 22 is spring biased upward and forward via a spring 54. In doing so, counterclockwise rotation of the rear foot 32 upward and forward causes the front pivot linkage 34 to rotate counterclockwise such that the upper end of the front pivot linkage 34 moves forward and downward as shown in FIG. 3. This causes the seatback 28 along with the rear foot 32 to move to a rotated forward position that provides enhanced space behind the seat assembly 22 to allow a user to enter or exit the vehicle 10 behind the seat assembly 22.

To prevent excessive rotation of the seat assembly 22, the mount 45 on base 30 has a stop member 56 that is configured to be contacted by the front end of the rear foot 32 in the fully pitched first non-use boarding position. The stop member 56 may include a stop plate that may be connected to or part of the mount 45 or may be connected directly to the base 30. Thus, the stop member provides an end of travel limiter.

The vehicle seat assembly 22 may further moved to a second non-use position shown in FIG. 4. In order to move the second non-use position, the fourth joint 46 is unlocked such as via a lever or an actuator which allows the seatback 28 to pivot forward relative to the fixed rear foot 32 and fold flat on top of the seat 26. In this position, the vehicle seat assembly 22 is in a storage configuration that allows for enhanced space for transporting articles within the vehicle 10.

Accordingly, the vehicle seat assembly 22 advantageously provides for a single-pivot pitch seat that may be moved amongst a use position and one or more non-use positions including a boarding non-use position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat assembly convertible between a use position and a non-use position, the vehicle seat assembly comprising:
   a seat with a seat cushion support;
   a seatback;
   a base configured to connect to a vehicle;
   a front pivot linkage supported by the base by a first joint and pivotally connected to the seat cushion support of the seat by a second joint;
   a rear foot pivotally supported on the base by a third joint, wherein a pivoting movement of the rear foot about the third joint is lockable, and wherein the rear foot is connected to the seatback by a fourth joint;
   a fifth joint that connects the seatback to the seat cushion support, wherein the fourth joint is a latch and the fifth joint provides a free pivot, and wherein the fourth joint is latched when the seat moves from the use position to a boarding non-use position; and
   a stop member including a stop plate supported on the base and located forward of the rear foot to contact the rear foot in the boarding non-use position.

2. The vehicle seat assembly of claim 1, wherein the vehicle seat is further convertible to a folded non-use position by unlatching the latch at the fourth joint.

3. The vehicle seat assembly of claim 2, wherein the latch comprises a recliner mechanism.

4. The vehicle seat assembly of claim 3, wherein the latch comprises a recliner heart.

5. The vehicle seat assembly of claim 1, wherein the stop member is connected to a mount supporting the first joint.

6. The vehicle seat assembly of claim 5 further comprising a bias spring for biasing the rear foot to pivot forward towards the stop member.

7. The vehicle seat assembly of claim 1, wherein the seat cushion support comprises a rigid member.

8. The vehicle seat assembly of claim 1 further comprising a lock mechanism operatively coupling the rear foot to the base to lock the third joint.

9. A vehicle seat assembly convertible between a use position and a non-use position, the vehicle seat assembly comprising:
   a seat with a seat cushion support;
   a seatback;
   a base configured to connect to a vehicle;
   a front pivot linkage supported by the base by a first joint and pivotally connected to the seat cushion support of the seat by a second joint;
   a rear foot pivotally support by the base by a third joint, wherein a pivoting movement of the rear foot about the third joint is lockable by a lock mechanism, and wherein the rear foot is connected to the seatback by a fourth joint;
   a fifth joint that connects the seatback to the seat cushion support, wherein the fourth joint is a latch and the fifth joint provides a free pivot, and wherein the fourth joint is latched when the seat moves from the use position to a boarding non-use position;
   a stop member located forward of the rear foot to contact the rear foot in the boarding non-use position, wherein the stop member includes a stop plate supported on the base; and
   a biasing spring for biasing the rear foot to pivot forward towards the stop member.

10. The vehicle seat assembly of claim 9, wherein the vehicle seat is further convertible to a folded non-use position by unlatching the latch at the fourth joint.

11. The vehicle seat assembly of claim 10, wherein the latch comprises a recliner mechanism.

12. The vehicle seat assembly of claim 11, wherein the latch comprises a recliner heart.

13. The vehicle seat assembly of claim 9, wherein the stop member is connected to a mount supporting the first joint.

14. The vehicle seat assembly of claim 9, wherein the seat cushion support comprises a rigid member.

15. The vehicle seat assembly of claim 9, wherein the locking mechanism operatively couples the rear foot to the base to lock the third joint.

16. A vehicle comprising:
   a cabin interior; and
   a vehicle seat assembly convertible between a use position and a non-use position, the vehicle seat assembly comprising:
      a seat with a seat cushion support;
      a seatback;
      a base connected to the vehicle in the cabin interior;
      a front pivot linkage supported by the base by a first joint and pivotally connected to the seat cushion support of the seat by a second joint;
      a rear foot pivotally supported on the base by a third joint, wherein a pivoting movement of the rear foot about the third joint is lockable, and wherein the rear foot is connected to the seatback by a fourth joint;
      a fifth joint that connects the seatback to the seat cushion support, wherein the fourth joint is a latch and the fifth joint provides a free pivot, and wherein the fourth joint is latched when the seat moves from the use position to a boarding non-use position; and
      a stop member including a stop plate supported on the base and located forward of the rear foot to contact the rear foot in the boarding non-use position.

17. The vehicle of claim 16, wherein the vehicle seat is further convertible to a folded non-use position by unlatching the latch at the fourth joint.

18. The vehicle of claim 16 further comprising a bias spring for biasing the rear foot to pivot forward towards the stop member.

* * * * *